(12) United States Patent
Zemenchik

(10) Patent No.: US 10,806,062 B2
(45) Date of Patent: Oct. 20, 2020

(54) SELF CLEANING GAUGE WHEEL ASSEMBLY

(71) Applicant: CNH Industrial America LLC, New Holland, PA (US)

(72) Inventor: Robert A. Zemenchik, Kenosha, WI (US)

(73) Assignee: CNH Industrial America LLC, New Holland, PA (US)

( * ) Notice: Subject to any disclaimer, the term of this patent is extended or adjusted under 35 U.S.C. 154(b) by 310 days.

(21) Appl. No.: 16/006,232

(22) Filed: Jun. 12, 2018

(65) Prior Publication Data

US 2019/0373794 A1 Dec. 12, 2019

(51) Int. Cl.
*A01B 15/00* (2006.01)
*A01B 63/00* (2006.01)
*A01C 5/06* (2006.01)

(52) U.S. Cl.
CPC ............ *A01B 15/00* (2013.01); *A01B 63/008* (2013.01); *A01C 5/064* (2013.01)

(58) Field of Classification Search
CPC .... A01L 315/00; A01L 315/16; A01L 63/008; A01L 71/08; A01L 23/06; A01L 33/087; A01C 5/064; A01C 7/203; B62D 55/088; B62D 55/0885
See application file for complete search history.

(56) References Cited

U.S. PATENT DOCUMENTS

| 160,309 | A | | 3/1875 | Davis | |
|---|---|---|---|---|---|
| 785,865 | A | | 3/1905 | Davis | |
| 2,052,068 | A | * | 8/1936 | Ziegler | A01B 11/00 172/258 |
| 2,413,246 | A | * | 12/1946 | Seal | A01B 23/06 172/66 |
| 2,607,277 | A | * | 8/1952 | Shelor | B62D 55/07 172/258 |
| 2,667,362 | A | | 1/1954 | Woodward et al. | |
| 2,760,322 | A | * | 8/1956 | Johnson | A01B 43/005 171/97 |
| 3,297,147 | A | * | 1/1967 | Sackett, Sr. | B65G 39/073 198/494 |
| 3,605,511 | A | * | 9/1971 | Deschene | F16H 55/563 474/14 |
| 4,137,853 | A | | 2/1979 | Peterson | |
| 4,180,155 | A | * | 12/1979 | Stevick | B65G 45/20 198/498 |

(Continued)

FOREIGN PATENT DOCUMENTS

FR 2 695 895 A1 3/1994

*Primary Examiner* — Jamie L McGowan

(74) *Attorney, Agent, or Firm* — Rebecca L. Henkel; Rickard K. DeMille

(57) ABSTRACT

A self-cleaning gauge wheel assembly having a gauge wheel mounted for rotation on an agricultural planter and adjustable to set the depth of the planting. A pulley having a diameter at least $\frac{1}{7}^{th}$ and less of the diameter of the gauge wheel is journaled about an axis spaced from and behind and elevated from the gauge wheel. An endless belt is provided around the gauge wheel and the pulley in tension so that movement of the planter, and associated rotation of the gauge wheel causes the pulley to accelerate any accumulated moist soil and expel it from the belt to provide a self-cleaning feature.

20 Claims, 3 Drawing Sheets

(56) References Cited

U.S. PATENT DOCUMENTS

| | | | | |
|---|---|---|---|---|
| 4,489,823 A * | 12/1984 | Gordon | ............... | B65G 45/12 15/256.5 |
| 4,763,961 A * | 8/1988 | Parrott | ............... | B62D 55/0882 180/9.1 |
| 4,825,969 A | 5/1989 | King et al. | | |
| 4,838,409 A * | 6/1989 | Rappen | ............... | B65G 45/12 198/497 |
| 5,222,589 A * | 6/1993 | Gordon | ............... | B65G 45/12 198/497 |
| 5,481,990 A | 1/1996 | Zacharias | | |
| 5,644,223 A | 7/1997 | Verkuil | | |
| 5,758,932 A | 6/1998 | Klopfenstein et al. | | |
| 5,775,447 A * | 7/1998 | Dester | ............... | B62D 55/088 180/9.1 |
| 5,865,294 A * | 2/1999 | Betz | ............... | B65G 45/12 198/497 |
| 5,884,711 A | 3/1999 | Shoup | | |
| 5,979,638 A * | 11/1999 | Wiggins | ............... | B65G 45/12 198/497 |
| 6,315,105 B1 * | 11/2001 | Gibbs | ............... | B65G 45/12 198/497 |
| 6,401,911 B1 * | 6/2002 | Swinderman | ............... | B65G 45/12 198/499 |
| 6,843,363 B2 * | 1/2005 | Schwarze | ............... | B65G 45/16 198/497 |
| 6,948,609 B2 * | 9/2005 | Finger | ............... | B65G 45/12 198/497 |
| 7,475,450 B1 * | 1/2009 | Ragner | ............... | A47L 5/30 15/384 |
| 7,681,656 B2 | 3/2010 | Jagow et al. | | |
| 7,819,237 B2 * | 10/2010 | Felton | ............... | B65G 45/16 198/499 |
| 7,832,814 B2 * | 11/2010 | Breton | ............... | B62D 55/088 305/107 |
| 8,100,205 B2 * | 1/2012 | Gettings | ............... | B62D 55/075 180/9.1 |
| 8,453,755 B2 * | 6/2013 | Renyer | ............... | A01C 7/203 111/163 |
| 8,776,990 B2 * | 7/2014 | Felton | ............... | B65G 45/16 198/499 |
| 8,813,865 B2 * | 8/2014 | Renyer | ............... | A01C 5/064 111/163 |
| 9,113,587 B2 | 8/2015 | Hesla | | |
| 9,162,717 B2 * | 10/2015 | Zakuskin | ............... | B62D 55/04 |
| 2010/0230124 A1 | 9/2010 | Martin | | |
| 2017/0318740 A1 | 11/2017 | Heathcote | | |

\* cited by examiner

SELF CLEANING GAUGE WHEEL ASSEMBLY

FIELD OF THE INVENTION

The present invention generally relates to agricultural seed planting implements and to the furrow opening assemblies thereon, and more particularly to the apparatus for adjusting the depth of the furrow opened by the furrow opening assembly.

BACKGROUND OF THE INVENTION

Farmers utilize a wide variety of seed planting implements, including seed drills and planters. In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly, often including one or more discs, for opening a seed trench or furrow in the ground as the planting implement is pulled across a field. Components of the ground penetrating assembly shape the bottom and sides of the seed trench, and a seed metering device provides individual seeds at a controlled rate for deposit in the seed trench. Furrow closing components of each row unit close the seed trench in a controlled manner.

It is a desirable and perhaps even a primary agronomic principle that seeds should be planted at precisely controlled and consistent depths. Since a single planting implement may be used to plant several different types of crops and/or the same crop in different planting locations under different planting and growing conditions, it is necessary that the planting depth is adjustable so that the seeds are placed at a depth that has been determined to be the best for seed germination and plant growth of the particular crop under the existing and anticipated conditions.

To control planting depth, it is known to provide gauge wheels that travel on the surface of the field to control the depth to which the ground penetrating assembly can run, the positions of the gauge wheels being adjustable so that the depth of the seed trench can be controlled within fractions of an inch. Adjustment linkages are provided for changing the relative positioning of the gauge wheels with respect to the ground penetrating assembly. It is known to move the adjustment linkage by a handle connected thereto, the handle engaging a register having multiple positions for securing the handle to maintain the position to which the handle is adjusted As growers have gained greater understanding about seed germination and plant growth, and as soil preparation procedures have changed and improved, crop growers have demanded more precise control over seed placement both in spacing between seeds and in the depth at which the seeds are placed below the soil surface. Accordingly, there is both a demand and a need for even more precise control over the depth of the seed trench that is formed during planting operations.

The need for precise depth control is even more important with changing conditions in the field. When conditions are wet and/or planting occurs in soil with a high clay content, moist soil and other debris tend to accumulate on or adhere to the gauge wheels which are the principal input in determining the depth of seed planting. In reduced tillage systems, there may be high residue volumes of finely chopped material, where moist soil and straw can accumulate on the gauge wheels. All of these accumulations can affect the relative diameter and circularity of the gauge wheel. When this occurs, seed depth control may be lost and can be seen by highly variable mesocotyl length present when randomly selected samplings are inspected.

The current approach to minimizing this problem is to incorporate a scraper closely adjacent the gauge wheels to scrape off any clumps of moist soil or debris. The scraper, however can introduce problems of its own by causing additional accumulation of debris at the scraper, creating restricted movement of planter row unit components, negatively affecting its performance.

What is needed in the art therefore is a more effective way of eliminating debris from gauge wheels in a planter assembly.

SUMMARY OF THE INVENTION

The present invention seeks to minimize, if not eliminate, moist soil and other debris from the gauge wheel in a planter.

In one form, the invention is a gauge wheel assembly for a planter including a gauge wheel journaled for rotation about an axis and adjustable to set the planter depth over the ground with the gauge wheel having a first diameter. A pulley is journaled for rotation about an axis parallel to and distally spaced from the axis of rotation of the gauge wheel, the pulley having a second diameter significantly smaller than the diameter of the gauge wheel. At least one endless belt extends around the gauge wheel and the pulley in tension to thereby shed moist soil or debris from the at least one endless belt as it wraps around the pulley.

In another form, the invention is a planter for traveling across a field in which the planter includes a frame connected to a transverse tool bar through a pivotal link connection. A seed trench opening assembly is mounted to the frame and a seed metering system, also mounted on the frame, deposits seeds in spaced locations in the seed trench. A seed trench closing mechanism is mounted on the frame for closing the seed trench. A gauge wheel, having a first diameter, is mounted on and journaled for rotation on the frame about an axis and adjustable to set the planter depth over the ground. A pulley is journaled for rotation on said frame about an axis parallel to and spaced from the axis of rotation of the gauge wheel, the pulley having a second diameter significantly smaller than the diameter of the gauge wheel. At least one endless belt extends around the gauge wheel and the pulley in tension, thereby shedding moist soil or debris from the at least one endless belt as it wraps around the pulley.

Preferably, the gauge wheel assembly of the present invention includes a device for retaining the at least one endless belt on the gauge wheel and pulley.

An advantage of the present invention is that the gauge wheel assembly is self-shedding of moist soil.

Another advantage is that the gauge wheel assembly substantially eliminates the need for a gauge wheel scraper.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
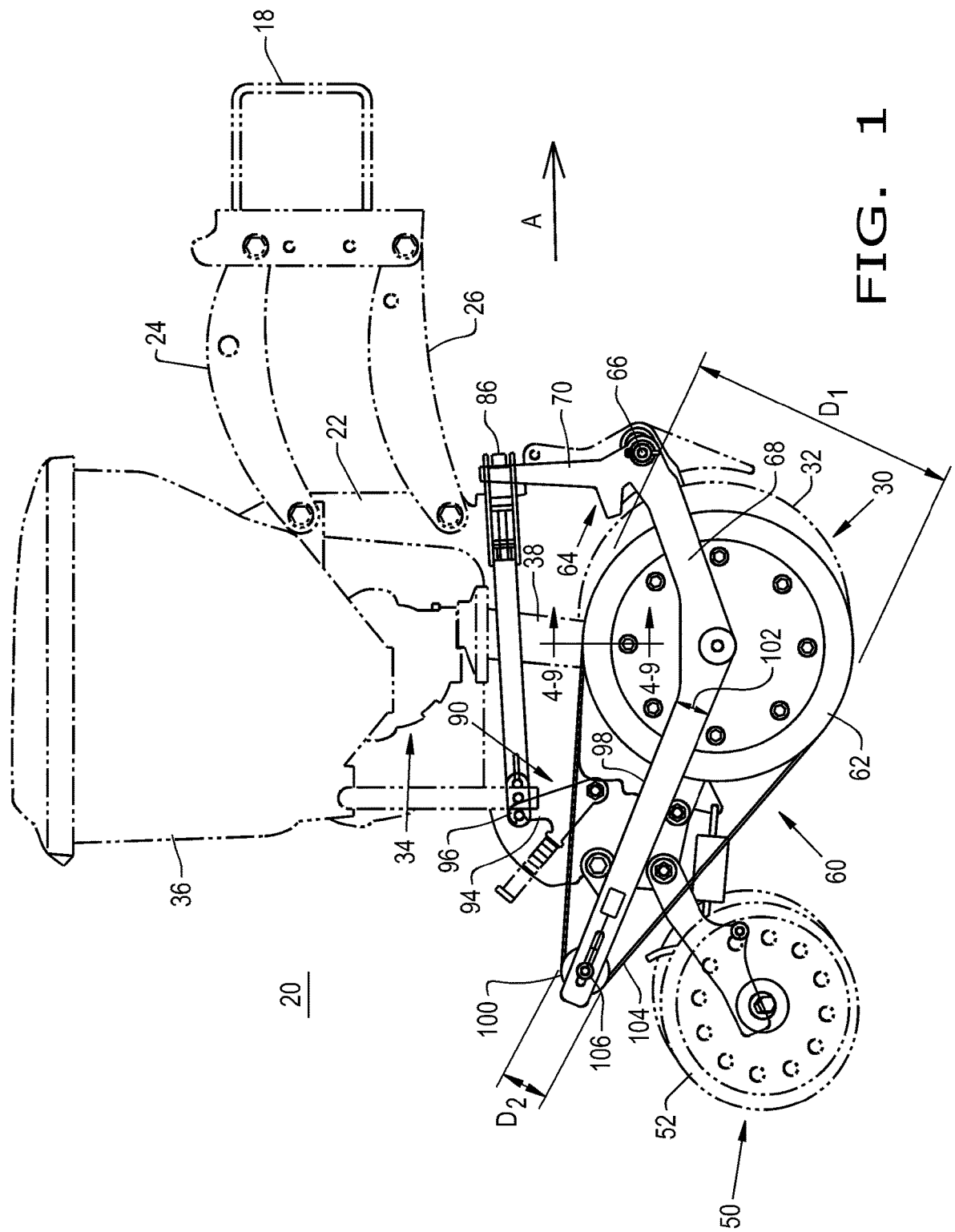
FIG. 1 is an agricultural planter illustrating an embodiment of the present invention.

Referring now to FIG. 1 in particular, a portion of a seed planting implement is shown. The seed planting implement has a frame that includes a tow bar assembly having a tow bar and a connection assembly at the longitudinally forward end thereof configured for mating with a corresponding hitch of a tractor or other work vehicle (not shown) for pulling seed planting implement across the ground and through a field. A laterally extending toolbar 18 is generally transverse to the tow bar and thereby generally transverse to the direction A the implement is towed during planting operations. A plurality of seed planting units (or row units) 20 are connected to toolbar 18 in a side by side relationship, each of the seed planting units (row units) being substantially identical to the others.

Referring again to FIG. 1 each seed planting unit 20 includes a frame 22 that is connected to toolbar 18 by a pivotal link connection having upper arms 24 and lower arms 26, each arm 24, 26 being pivotally connected to frame 22 and to toolbar 18. Accordingly, each seed planting unit 20 extends rearward from toolbar 18 to plant a row of seeds as seed planting implement 10 is towed across a field in the travel direction A. The individual planting units 20 are spaced along toolbar 18 to provide planted seed rows of a desired spacing. During a planting operation, forward movement of the seed planting implement in the travel direction A causes each seed planting unit 20 to form a seed trench, deposit equally spaced seeds in the seed trench and close the seed trench over the deposited seeds.

Each seed planting unit 20 includes a ground penetrating or seed trench opening assembly 30 having a pair of forwardly and downwardly angled opening discs 32 that converge forwardly and downwardly to open a furrow or seed trench as seed planting unit 20 moves forward. A seed metering system 34 receives seeds from a seed hopper 36 and provides individual seeds at a controlled rate to a seed tube 38 for deposit in the bottom of the seed trench formed. A vacuum system (not shown) provides vacuum to seed metering system 34 for the operation of the seed metering system and supplying seeds to seed tube 38.

A seed trench closing mechanism 50 (FIG. 1) at the trailing end of each seed planting unit 20 closes the seed trench after the seeds have been deposited in the seed trench. Seed trench closing mechanism 50 includes a pair of pinch wheels 52 that operate on opposite sides of the seed trench to move soil back into the seed trench and over the seeds deposited in the bottom of the seed trench.

The depth to which opening discs 32 are allowed to penetrate the ground is controlled by a depth control assembly 60 that includes a pair of gauge wheels 62, gauge wheel arms 64 and a depth adjuster and linkage assembly 80. One of the gauge wheels 62 is provided adjacent each opening disc 32. Each gauge wheel 62 is rotatably mounted on one of the gauge wheel arms 64 that are pivotally connected at a pivotal attachment 66 to seed planting unit frame 22. Each gauge wheel arm 64 has a wheel retention segment 68 extending generally rearward from pivotal attachment 66 and a control segment 70 extending generally upward from pivotal attachment 66. Pivoting gauge wheel arm 64 about pivotal attachment 66 to frame 22 changes the relative height position of each gauge wheel 62.

A pivoted position to which each gauge wheel arm 64 is placed is controlled by a depth adjuster and linkage assembly having a control assembly 90, a depth control linkage arm 84 and a wobble bracket 86. Control assembly 90 adjusts an axial position for linkage arm 84 and thereby the position of wobble bracket 86, with wobble bracket 86 engaging control segments 70 of gauge wheel arms 64. Raising gauge wheels 62 allows opening discs 32 to penetrate deeper into the ground, and lowering gauge wheels 62 reduces the depth to which discs 32 can penetrate into the ground.

When the agricultural planter 20 of FIG. 1 is operated in the field, there are times when the soil of the ground over which the planter is operated is either wet or has a substantial clay content such as experienced in the American southeast and certain Latin American countries. In this instance, the existing tendency to accumulate moist soil on the gauge wheels is exacerbated because the clumps are larger and less uniform. As previously stated, this can have an adverse effect on the consistency of the depth at which the seeds are planted.

Figure 2:
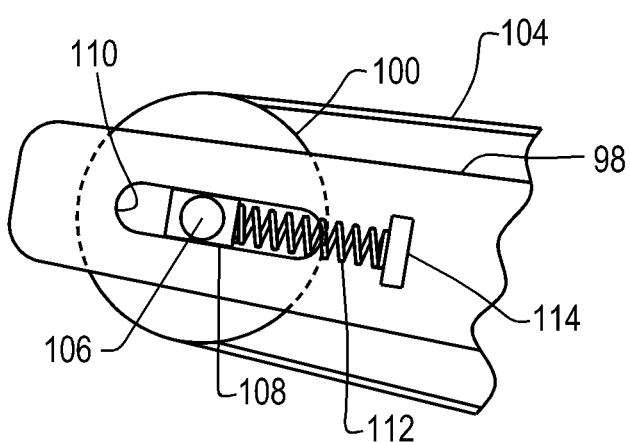
FIG. 2 is an expanded fragmentary view of FIG. 1 showing one embodiment of an aspect of the present invention.
Figure 3:
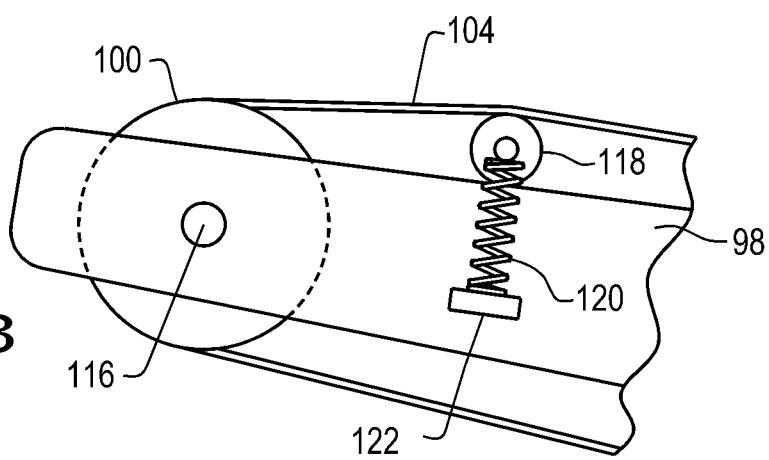
FIG. 3 is an expanded fragmentary view of FIG. 1 showing an alternative feature of the present invention.

In accordance with the present invention, the planter of FIG. 1 has a gauge wheel assembly that embodies the present invention. The gauge wheel assembly has a gauge wheel extension arm 98 that may be integral with gauge wheel arm 64 or it may be detachable at separation junction 102 illustrated by dashed lines to enable retro fitting to existing agricultural planters. When formed as a separate piece, gauge wheel extension arm 98 may be fastened to the gauge wheel arms 64 by any number of fastening attachments (not illustrated to enable a clearer understanding of the present invention). Gauge wheel extension arm 98, as illustrated, extends rearward and upward from the rotational axis of gauge wheel 62 and provides adjacent its end a pulley 100 that has a rotational axis parallel to and spaced from the rotational axis of gauge wheel 62. Pulley 100 has a width substantially equal to the width of gauge wheel 62 and an endless belt 104 extends around gauge wheel 62 and pulley 100 and is held in tension by a tension mechanism, several of which are illustrated in FIGS. 2 and 3. Thus, the major point of contact of the gauge wheel assembly is adjacent the gauge wheel 62.

The gauge wheel 62 has a first diameter D1 and the pulley 100 has a second diameter D2. The ratio of the diameters is such that the diameter of the pulley 100 is significantly smaller than the diameter of gauge wheel 62. The ratio of the diameters of D1 over D2 is preferably over 5:1 and more preferably at 7:1 or greater. The significance of the increased ratio between the diameters has an impact on angular momentum and its effect on moist soil that is attached to the bottom of the endless belt 104. As it travels across the ground, the mud must follow the shortened radius as it wraps around the pulley 100 and the increased RPM causes the moist soil to be propelled from the pulley 102 by centrifugal force. This enables the gauge wheel assembly to be self-cleaning by expelling any accumulated moist soil before the belt extends around the forward portion of the gauge wheel 62 to engage the ground. One example may be that the production gauge wheel has a 14 inch diameter and the diameter of the pulley 100 is two inches. This produces a whipping action and provides effective expelling of moist soil from the belt. The smaller diameter of the pulley will increase the angular velocity of the moist soil which aids in propelling it from the belt.

The endless belt 104 is urged around the gauge wheel 62 and pulley 100 by the motion of the seed planting unit 20 in the direction A. In order to maintain an effective movement of the belt 104, it is placed in tension over the gauge wheel 62 and pulley 100. There are many examples of devices to maintain the belt in tension and two of the many are illustrated in FIGS. 2 and 3, showing expanded fragmentary views of the gauge wheel extension arm 98.

Referring first to FIG. 2, the pulley 100 has rotational attachment 106 to a block 108 slidable in a longitudinal slot 110. Another block 108 would be on the opposite end face of pulley 100 and a spring 112 acts on the block 108 and a spring abutment 114 structurally connected to gauge wheel extension arm 98 to yieldably urge block 108 in a direction that maintains the belt 104 in tension over pulley 100 and gauge wheel 62. Although not illustrated, the spring compression may be varied by an adjustable abutment to maintain the belt 104 at a given tension. The yieldable force may be provided by any number of hydraulic air and mechanical devices.

FIG. 3 illustrates yet one more example of a structure to maintain the belt 104 in tension. In this instance, the rotational attachment 106 for pulley 100 is fixed on the gauge wheel extension arm 98 and also oriented parallel to the rotational axis of gauge wheel 62. An idler pulley 118 acts on the inside face of belt 104 to urge it in an outer direction thus maintaining tension. A spring 120 and spring abutment 122 may be employed with appropriate guides to control the force extending the belt outward. The idler pulley 118 may also be arranged on the outside face of the belt 100 and urged inward.

Figure 4:
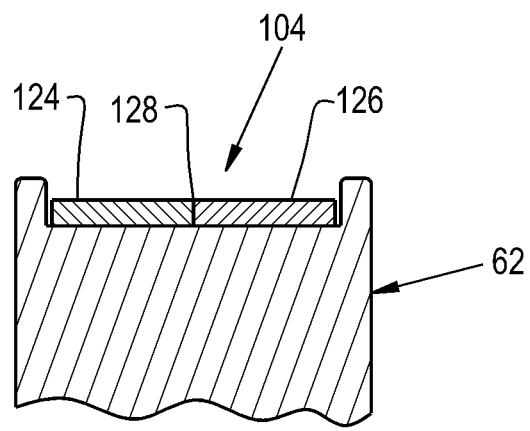
FIG. 4 is an expanded fragmentary cross-sectional view taken on lines (4-9)-(4-9) of FIG. 1.

The belt 104 enables the rubber lamination of the current gauge wheel 62 to be replaced and is formed from a flexible material having durability and extended life. The belt 104 may be formed as a single piece extending substantially across the width of the gauge wheel 62 and pulley 100 or it may be provided as a plurality of narrower belts as illustrated in FIG. 4 in which adjacent belts 124 and 126 abut along a longitudinal junction line 128 to provide coverage across the widths of gauge wheel 62 and pulley 104 while providing a greater ability to conform to variations in the contours of the gauge wheel 62 and/or the pulley 100.

Figure 5:
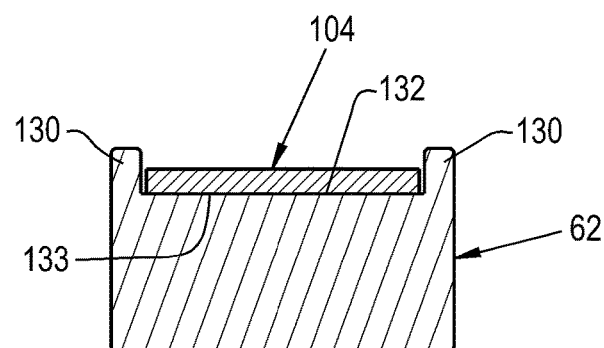
FIGS. 5-9 are fragmentary cross-sectional view showing alternative constructions of the agricultural planter shown in FIG. 1, taken on lines (4-9)-(4-9) of FIG. 1.

In accordance with another aspect of the present invention, a configuration is provided to retain the endless belt 104 on the gauge wheel 62 and the pulley 100. One of several of a number of configurations are illustrated in FIGS. 5-9. Addressing first FIG. 5, the gauge wheel 62 has a flat outer configuration 132 with circumferential flanges 130 at opposite extremities of its width. A flat belt 132 is received over surface 133 and between flanges 130 to retain it in place over the belt. FIG. 5 shows the configuration of the gauge wheel 62 and the configuration of the pulley 100 may be similar to but with a much smaller diameter.

Figure 6:
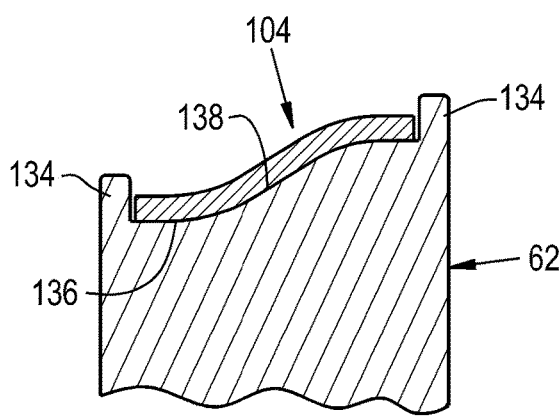

FIG. 6 shows a gauge wheel that has a curved outer shape as is the case with many current gauge wheels. In this configuration, the gauge wheel 62 has a curved outer shape and flanges 134 at the extremities of the width. Flanges 134 are circumferential and retain a curved belt 136 between them. The configuration of the pulley 100 may be similar to that for the gauge wheel 62 as discussed above.

Figure 7:
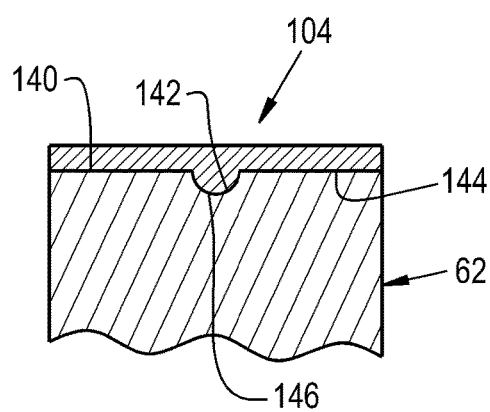

Referring to FIG. 7, there is an alternate configuration for retaining belt 104 on gauge wheel 62. Gauge wheel 62 has a substantially flat cross section providing a flat outer gauge wheel 140 and a circumferential recess 142. A flat belt 144 wraps around the surface 140 and a longitudinal rib 146 is received in and rides in circumferential groove 142 to maintain the belt 104 between the width extremities of the gauge wheel 62.

Figure 8:
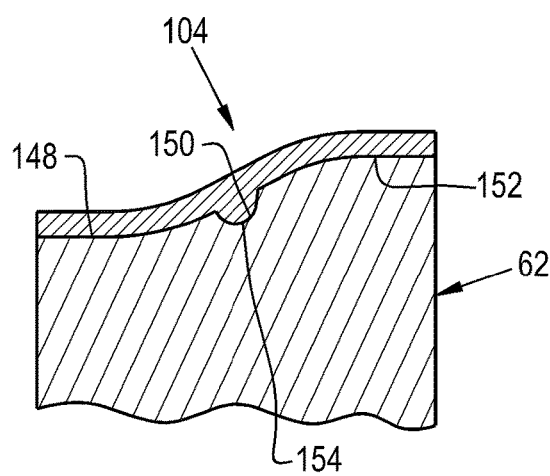

FIG. 8 shows a configuration for a gauge wheel 62 having a curved outer gauge wheel 148. A circumferential recess 150 is provided at an appropriate location between the ends of the gauge wheel 62. The curved belt 152 includes a longitudinal rib 154 which is received in and guided by circumferential recess 150 to maintain the curved belt 152 between the extremities of the width of gauge wheel 62.

Figure 9:
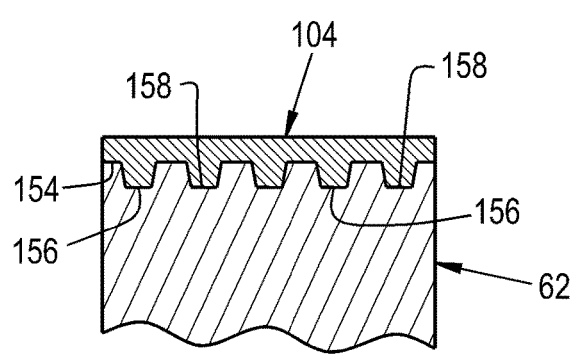

Referring to FIG. 9, there is an alternate configuration for retaining belt 104 on gauge wheel 62. Belt 104 has a flat outer surface and an inner surface 154 with a plurality of longitudinal ribs 156. Gauge wheel 62 has a generally flat cross section with a plurality of circumferential recesses 158 receiving the longitudinal ribs 156. The belt 104 wraps around the gauge wheel 62 and the longitudinal ribs 156 and recesses 158 to maintain the belt 104 between the width extremities of the gauge wheel 62.

It should be noted that the belts illustrated in FIGS. 5-9 may be employed with a single belt or multiple belt as illustrated in FIG. 4. Additionally, the longitudinal ribs and circumferential grooves described in FIGS. 7 and 8 may be reversed so that the gauge wheel 62 and pulley 100 have a projecting circumferential rib and the belt may have a longitudinal recess received over the circumferential rib. Furthermore, the belt configuration shown in FIG. 9 may be employed with a curved gauge wheel cross-section and/or a plurality of narrower belts.

In any of the configurations, the provision of the gauge wheel and the much smaller pulley may be employed to provide significantly high angular velocities around the pulley, thus causing any moist soil to be flung from the pulley by centrifugal force and providing a self-cleaning action to the belt without the need for existing prior art scrapper systems or devices.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A gauge wheel assembly for a planter, comprising
   a gauge wheel journaled for rotation about an axis and adjustable to set the planter depth over the ground, said gauge wheel having a first diameter;
   a pulley journaled for rotation about an axis parallel to and distally spaced from the axis of rotation of said gauge wheel, said pulley having a second diameter significantly smaller than the diameter of said gauge wheel; and
   at least one endless belt extending around said gauge wheel and said pulley in tension, thereby shedding moist soil from said at least one endless belt as it wraps around said pulley.

2. The gauge wheel assembly as claimed in claim 1, wherein said gauge wheel and said pulley each have a width and said endless belt extends substantially to the width thereof.

3. The gauge wheel assembly as claimed in claim 2, having a plurality of belts in a side-by-side relationship and covering said width.

4. The gauge wheel assembly as claimed in claim 1, wherein said gauge wheel moves across the ground in a travel direction and said pulley is positioned behind said gauge wheel.

5. The gauge wheel assembly as claimed in claim 1, wherein said pulley is elevated so that belt contacts the ground substantially only adjacent and around said gauge wheel.

6. The gauge wheel assembly as claimed in claim 1, wherein the ratio of diameters between the pulley and said gauge wheel is at least 5:1 and above.

7. The gauge wheel assembly as claimed in claim 1, wherein the ratio of the diameters between said gauge wheel and said pulley is at least 7:1 and above.

8. The gauge wheel assembly as claimed in claim 1, further comprising a device for retaining said endless belt on said gauge wheel and said pulley.

9. The gauge wheel assembly as claimed in claim 8, wherein said retaining device comprises a circumferential flange at the extremities of the widths of said gauge wheel and pulley for retaining said at least one endless belt therebetween.

10. The gauge wheel assembly as claimed in claim 8, wherein said retaining device comprises at least one circumferential recess on said gauge wheel and said pulley and a longitudinal rib on the inner face of said at least one endless belt received in each of said at least one circumferential groove for retaining said at least one endless belt.

11. The gauge wheel assembly as claimed in claim 10, having a plurality of longitudinal ribs on the inner face of said at least one endless belt received in a plurality of circumferential grooves for retaining said at least one endless belt.

12. The gauge wheel assembly as claimed in claim 1, wherein at least said gauge wheel has one of a substantially a straight cross section configuration and a curved cross section configuration.

13. The gauge wheel assembly as claimed in claim 1, further comprising a device for yieldably urging said pulley and said gauge wheel away from one another to adjust tension in said at least one endless belt.

14. A planter for traveling across a field and over the ground, said planter comprising:
  a frame connected to a transverse tool bar through a pivotal link connection;
  a seed trench opening assembly mounted to said frame;
  a seed metering system mounted on said frame for depositing seeds in spaced locations in said seed trench;
  a seed trench closing mechanism mounted on said frame for closing said seed trench;
  a gauge wheel mounted to and journaled for rotation about an axis on said frame and adjustable to set the planter depth over the ground, said gauge wheel having a first diameter;
  a pulley journaled for rotation about an axis parallel to and distally spaced from the axis of rotation of said gauge wheel, said pulley having a second diameter significantly smaller than the diameter of said gauge wheel; and,
  at least one endless belt extending around said gauge wheel and said pulley in tension thereby shedding moist soil from said at least on endless belt as it wraps around said pulley.

15. The planter as claimed in claim 14, wherein the ratio of the diameter of the gauge wheel relative to said pulley is at least 5:1 and above.

16. The planter as claimed in claim 14, wherein the ratio of the diameter of said gauge wheel relative to said pulley is at least 7:1 and above.

17. The planter as claimed in claim 14, further comprising a device for yieldably urging said pulley and gauge wheel away from one another to adjust tension in the belt.

18. The planter as claimed in claim 14, wherein at least said gauge wheel has a curved cross sectional configuration.

19. The planter as claimed in claim 14, further comprising a device for retaining said belt on said gauge wheel and said pulley.

20. The planter as claimed in claim 19, wherein said retaining device comprises circumferential flanges at the extremities of the width of said gauge wheel and said pulley for retaining the endless belt therebetween.

* * * * *